United States Patent
Ribbich et al.

(10) Patent No.: US 9,918,180 B2
(45) Date of Patent: Mar. 13, 2018

(54) SYSTEMS AND METHODS FOR DETECTING AND USING OCCUPANT LOCATION IN A BUILDING MANAGEMENT SYSTEM

(71) Applicant: Johnson Controls Technology Company, Holland, MI (US)

(72) Inventors: Joseph R. Ribbich, Milwaukee, WI (US); John S. Jilek, Milwaukee, WI (US); Dana S. Petersen, Milwaukee, WI (US); Ryan J. Bykowski, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 572 days.

(21) Appl. No.: 14/263,639

(22) Filed: Apr. 28, 2014

(65) Prior Publication Data
US 2015/0312696 A1    Oct. 29, 2015

(51) Int. Cl.
*H04W 4/02*    (2009.01)
*H04W 4/00*    (2018.01)
*H04W 4/04*    (2009.01)

(52) U.S. Cl.
CPC ........... *H04W 4/001* (2013.01); *H04W 4/043* (2013.01)

(58) Field of Classification Search
CPC .. G05B 2219/25062; G05B 2219/2642; G05B 15/02; H04W 4/043; H04W 4/008; H04W 64/00; H04W 4/02; H04W 64/003; H04W 4/021; H05B 37/0227; H05B 37/0272; Y02B 20/40; G06F 17/50
See application file for complete search history.

(56) References Cited

U.S. PATENT DOCUMENTS

| | | | |
|---|---|---|---|
| 2009/0065596 A1* | 3/2009 | Seem .................. | F24F 11/0009 236/51 |
| 2011/0071685 A1 | 3/2011 | Huneycutt et al. | |
| 2011/0115816 A1* | 5/2011 | Brackney ............... | G06Q 10/06 345/629 |

(Continued)

FOREIGN PATENT DOCUMENTS

| | | |
|---|---|---|
| EP | 2 228 270 | 9/2010 |
| EP | 2 372 263 | 10/2011 |

(Continued)

*Primary Examiner* — Nathan Mitchell
*Assistant Examiner* — Dung Lam
(74) *Attorney, Agent, or Firm* — Foley & Lardner LLP

(57) ABSTRACT

Systems and methods for using occupant location in a building management system are provided. A plurality of wireless emitters are provided at various locations in a building. Each of the wireless emitters broadcasts a different emitter identifier. Mobile devices in the building run an application which causes the mobile devices to detect and report, to the building management system, an emitter identifier associated with a nearby wireless emitter. The building management system uses the reported emitter identifier to determine a building zone in which the mobile device is located. The building management system provides information to the mobile device based on the location of the mobile device in the building. In some embodiments, the information includes a user interface for monitoring and/or controlling the building zone in which the mobile device is located.

8 Claims, 6 Drawing Sheets

(56) References Cited

U.S. PATENT DOCUMENTS

| | | | | |
|---|---|---|---|---|
| 2013/0132854 A1* | 5/2013 | Raleigh | ............... | G06F 3/0482 |
| | | | | 715/738 |
| 2014/0279210 A1* | 9/2014 | Cooney | ............. | G06Q 30/0633 |
| | | | | 705/26.8 |
| 2015/0012124 A1* | 1/2015 | Hiroki | ............. | H01L 21/67196 |
| | | | | 700/121 |
| 2016/0086290 A1* | 3/2016 | Blake | ................... | G06Q 10/10 |
| | | | | 705/7.29 |

FOREIGN PATENT DOCUMENTS

| | | |
|---|---|---|
| EP | 2 438 800 | 4/2012 |
| EP | 2 607 802 | 6/2013 |
| WO | WO-2010/141076 | 12/2010 |
| WO | WO-2013/049297 | 4/2013 |
| WO | WO-2013/089713 | 6/2013 |

\* cited by examiner

SYSTEMS AND METHODS FOR DETECTING AND USING OCCUPANT LOCATION IN A BUILDING MANAGEMENT SYSTEM

BACKGROUND

The present disclosure relates generally to the field of building management systems. The present disclosure relates more particularly to systems and methods for detecting and using the location of a building occupant in a building management system.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

SUMMARY

One implementation of the present disclosure is a method for providing a location-based user interface to a mobile device in a building management system. The method includes providing a plurality of wireless emitters in a building. Each of the wireless emitters is located at a different position in the building and is associated with a different emitter identifier. The method further includes receiving, at a processing circuit of the building management system, a request for a user interface for presentation on a mobile device. The request includes an emitter identifier associated with one of the plurality of wireless emitters detected by the mobile device. The method further includes using the emitter identifier to select, by the processing circuit, a user interface for a building zone associated with the emitter identifier and providing the selected user interface to the mobile device. The selected user interface includes display data related to the building zone associated with the emitter identifier.

In some embodiments, using the emitter identifier to select a user interface includes using the emitter identifier to determine a building zone in which the mobile device is located and selecting the user interface associated with the building zone in which the mobile device is located.

In some embodiments, the mobile device actively detects a wireless signal from one or more of the plurality of wireless emitters. The wireless signal may include the emitter identifier. In some embodiments, the request for the user interface is made by an application executing on the mobile device.

In some embodiments, the user interface is a local control interface for the building zone associated with the emitter identifier. The local control interface may include an interface option for controlling a variable state or condition of the building zone associated with the emitter identifier. In some embodiments, the user interface includes display data based on a variable state or condition of the building zone associated with the emitter identifier.

In some embodiments, the processing circuit selects the user interface from a plurality of user interfaces. Each of the plurality of user interfaces may be associated with a different building zone.

In some embodiments, the request for a user interface includes at least one of a mobile device identifier and a user identifier. In some embodiments, the user interface provided to the mobile device is selected, by the processing circuit, based on at least one of the mobile device identifier and the user identifier.

In some embodiments, the method further includes identifying building equipment in the building zone associated with the emitter identifier. The user interface may include an equipment maintenance history for the building equipment in the building zone associated with the emitter identifier.

In some embodiments, using the emitter identifier to select a user interface includes using the emitter identifier to determine whether the mobile device is located in a same building zone in which a particular piece of machinery is located and selecting a user interface which allows control over the piece of machinery based on a result of the determination.

Another implementation of the present disclosure is a method for providing location-based information to a mobile device in a building management system. The method includes providing a plurality of wireless emitters in a building. Each of the wireless emitters is located at a different position in the building and is associated with a different emitter identifier. The method further includes receiving, at a processing circuit of the building management system, a data communication from a mobile device. The data communication includes an emitter identifier associated with one of the plurality of wireless emitters detected by the mobile device. The method further includes using the emitter identifier to determine, by the processing circuit, a building zone in which the mobile device is located and providing information to the mobile device based on the building zone in which the mobile device is located.

In some embodiments, the mobile device actively detects a wireless signal from one or more of the plurality of wireless emitters. The wireless signal may include the emitter identifier. In some embodiments, the mobile device reports the detected emitter identifier to the processing circuit of the building management system.

In some embodiments, the information provided to the mobile device includes directions from the building zone in which the mobile device is located to another building zone within the building. In some embodiments, the information provided to the mobile device includes a map of an interior of the building indicating a location of the mobile device on the map. In some embodiments, the information provided to the mobile device includes at least one of a location-based alert and a location-based notification.

In some embodiments, the method further includes receiving, at the processing circuit, at least one of a mobile device identifier and a user identifier associated with the mobile device. The information provided to the mobile device may be based on at least one of the mobile device identifier and the user identifier.

In some embodiments, the method further includes using a history of emitter identifiers received from the mobile device to determine a history of building zones in which the mobile device has been located at different times and storing a location history for the mobile device. The location history may include an indication of the history of building zones in which the mobile device has been located. In some embodiments, the information provided to the mobile device is a user interface for selecting a building zone from the history of building zones in which the mobile device has been located.

In some embodiments, the method further includes receiving, at the processing circuit, a request for a user interface for presentation on the mobile device. The information provided to the mobile device may be a user interface for the building zone in which the user device is located.

Another implementation of the present disclosure is a method for providing location-based control in a building management system. The method includes providing a plurality of wireless emitters in a building. Each of the wireless emitters is located at a different position in the building and is associated with a different emitter identifier. The method further includes receiving, at a processing circuit of the building management system, a data communication from a mobile device. The data communication includes an emitter identifier associated with one of the plurality of wireless emitters detected by the mobile device and at least one of a user identifier and a device identifier associated with the mobile device. The method further includes using the emitter identifier to determine, by the processing circuit, a building zone in which the mobile device is located, using at least one of the user identifier and the device identifier to identify, by the processing circuit, a user associated with the mobile device, and controlling a variable state or condition of the building zone in which the mobile device is located based on an identity of the user associated with the mobile device.

In some embodiments, the method further includes using emitter identifiers received from a plurality of mobile devices to estimate a number of occupants in a building zone and controlling a variable state or condition of each of the building zone based on the estimated number of occupants in the building zone. In some embodiments, the method further includes reporting the estimated number of occupants in the building zone to at least one of security personnel and emergency personnel via a user interface device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for detecting and using occupant location in a building management system (BMS) are shown, according to various exemplary embodiments. The systems and methods described herein may be used to automatically determine the location of mobile wireless devices in or around a building. For example, the building may be equipped with a plurality of wireless emitters positioned at known locations. Each wireless emitter may be configured to emit a unique wireless signal including an emitter identifier. Mobile devices within the building may detect the wireless signals and report the detected emitter identifiers to the BMS. The BMS may use the emitter identifiers reported by the mobile devices to determine the location of the mobile devices.

In some embodiments, the BMS provides a mobile device with a user interface for monitoring and/or controlling a particular building zone based on the location of the mobile device. For example, the BMS may provide a mobile device with a user interface for controlling a building zone in which the mobile device is currently located or was previously located. The user interface provided to the mobile device may be a local control interface (e.g., with user-interactive control options) or an informational interface (e.g., without user-interactive control options). In some embodiments, the BMS provides the mobile device with location-based information (e.g., location-based alerts or notifications, location-based configuration or control options, etc.). The control options and/or information provided to the mobile device may be based on the location of the mobile device and/or the identity of a user associated with the mobile device. In some embodiments, the BMS uses the location of a mobile device and/or the identity of the user associated with the mobile device to automatically control a variable state or condition of the building zone in which the mobile device is located.

Figure 1:
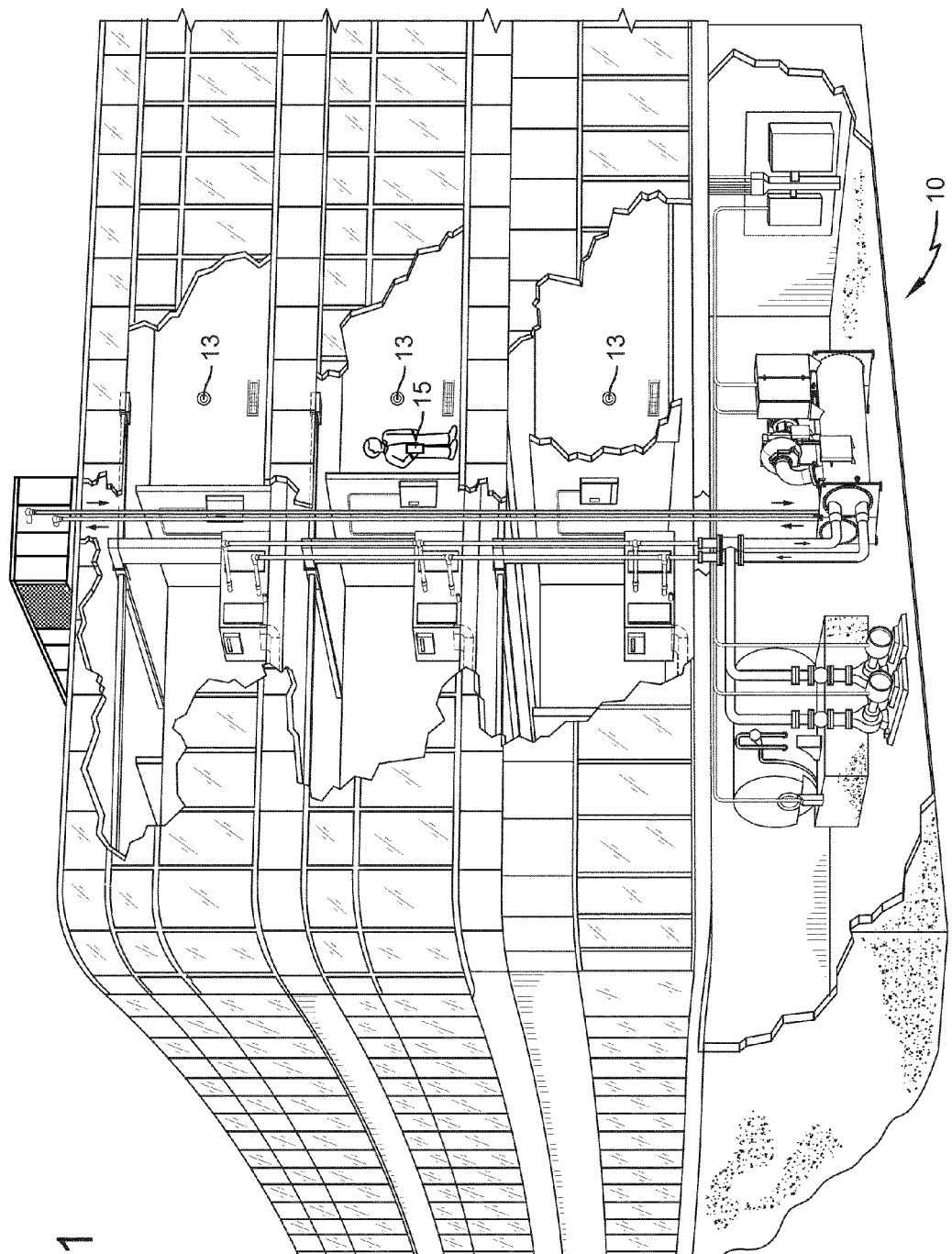
FIG. 1 is a drawing of a building equipped with a building management system including a plurality of wireless emitters, according to an exemplary embodiment.

Referring now to FIG. 1, a perspective view of a building 10 is shown, according to an exemplary embodiment. A BMS serves building 10. The BMS for building 10 may include any number or type of devices that serve the building. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

Building 10 is shown to include a plurality of wireless emitters 13. Wireless emitters 13 may be positioned at various locations within or around building 10 (e.g., inside rooms or zones, at entrance/exit points, in hallways, etc.). Wireless emitters 13 may be configured to emit, receive, sense, relay, or otherwise engage in unidirectional or bidirectional wireless communications. Wireless emitters 13 may use any type wireless technology or communications protocol. For example, in various embodiments, wireless emitters 13 may be Bluetooth low energy (BLE) emitters, near field communications (NFC) devices, WiFi transceivers, RFID devices, ultrawide band (UWB) devices, infrared emitters/sensors, visible light communications (VLC) devices, ultrasound devices, cellular transceivers, or any other type of hardware configured to facilitate wireless data communications. In some embodiments, wireless emitters 13 may be integrated with existing BMS devices within building 10 (e.g., thermostats, lighting sensors, zone controllers). In some embodiments, each of wireless emitters 13 emits a wireless signal that includes an emitter identifier.

The wireless signals emitted by wireless emitters 13 may be detected by various mobile devices 15 in or around building 10. Mobile devices 15 may include, for example, laptop computers, tablets, smart phones, RFID sensors, Bluetooth devices, WiFi devices, NFC devices, portable communications devices, or any combination thereof. Mobile devices 15 may be configured (e.g., by an application running on mobile devices 15) to identify the emitter identifier associated with detected wireless signals and to report detected emitter identifiers to the BMS (e.g., via a mobile applications gateway).

The BMS may use the emitter identifier or identifiers reported by mobile devices 15 to determine the location of mobile devices 15 in or around building 10 (e.g., in a particular building zone within building 10, between building zones, outside building 10, etc.). For example, the BMS may use a stored association between the emitter identifier reported by a mobile device and a particular building zone to determine that the mobile device is located within or near the associated building zone. In some embodiments, the BMS provides the mobile device with a user interface for monitoring and/or controlling the building zone in which the mobile device is located. Advantageously, the BMS can automatically detect the location of mobile devices 15 and deliver a location-specific user interface to mobile devices 15 without requiring a user to input location information.

Figure 2:
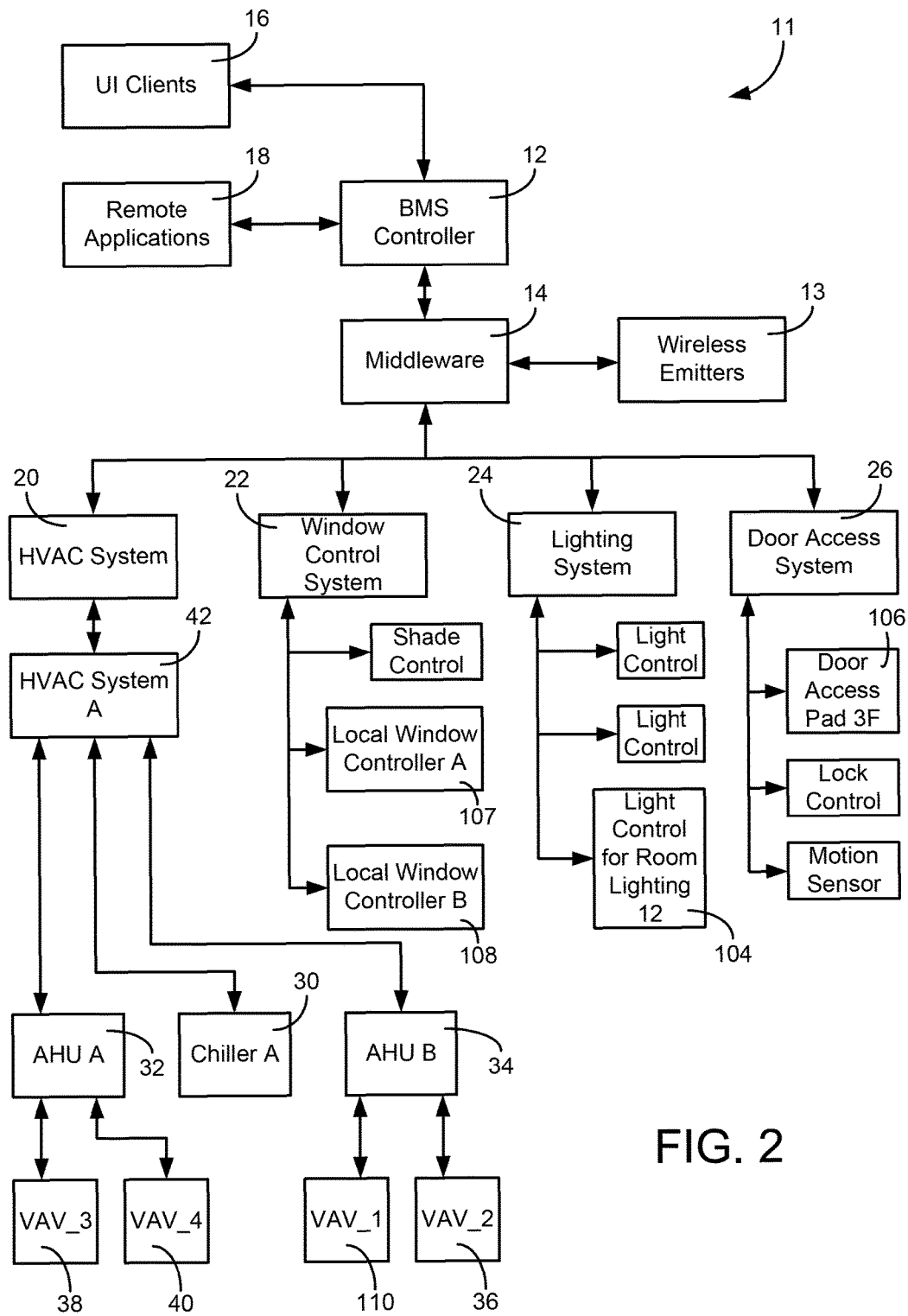
FIG. 2 is a block diagram illustrating the building management system of FIG. 1, according to an exemplary embodiment.

Referring now to FIG. 2, a block diagram of an exemplary BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 is shown to include a lower-level HVAC system 42 (named "HVAC system A") HVAC system 20 may control HVAC operations for a given building (e.g., building 10), while HVAC system A 42 controls HVAC operations for a specific floor or zone of building 10. HVAC system A 42 is connected to air handling units (AHUs) 32, 34 (named "AHU A" and "AHU B" in the BMS, respectively). AHU 32 may control variable air volume (VAV) boxes 38, 40 (named "VAV_3" and "VAV_4" in the BMS). Likewise, AHU 34 may control VAV boxes 36 and 110 (named "VAV_2" and "VAV_1"). HVAC system 42 may also include chiller 30 (named "Chiller A" in the BMS). Chiller 30 may provide chilled fluid to AHU 32 and/or to AHU 34.

HVAC system 42 may also receive data from AHUs 32, 34 (e.g., a temperature setpoint, a damper position, temperature sensor readings). HVAC system 42 may then provide such BMS inputs up to HVAC system 20 and on to middleware 14 and BMS controller 12. Similarly, other BMS subsystems may receive inputs from other building devices or objects and provide them to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, in various exemplary embodiments, middleware 14 and BMS controller 12 are integrated. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B" in the BMS, respectively). Window controllers 107, 108 control the operation of subsets of the window control system 22. For example, window controller 108 may control window blind or shade operations for a given room, floor, or building in the BMS.

Lighting system 24 may receive lighting related information from a plurality of downstream light controls, for example, from room lighting 104. Door access system 26 may receive lock control, motion, state, or other door related information from a plurality of downstream door controls. Door access system 26 is shown to include door access pad 106 (named "Door Access Pad 3F"), which may grant or deny access to a building space (e.g., floor, conference room, office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from the various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified building objects (e.g., software objects stored in memory) to help provide the transparency. Software building objects may allow developers to write applications capable of monitoring and/or controlling building zones on a zone-by-zone level regardless of the building subsystem makeup.

Still referring to FIG. 2, BMS 11 is shown to include wireless emitters 13. Wireless emitters 13 may be positioned at various locations in or around building 10 and may be connected to BMS controller 12 via middleware 14. In some embodiments, each of wireless emitters 13 is associated with a particular building zone (e.g., a room, a hallway, an entry or exit point, etc.). The associations between wireless emitters 13 and building zones may be managed by the BMS. For example, when a wireless emitter is installed in building 10, the location of the wireless emitter may be stored in memory (e.g., as an attribute of a software defined building object representing a building zone) and the wireless emitter may be mapped (e.g., associated with, linked, etc.) to a building zone. In various embodiments, a single building zone may be associated with any number of wireless emitters 13 and each of wireless emitters 13 may be associated with any number of building zones. Each of wireless emitters 13 may be located at a different position in or around building 10.

In some embodiments, each of wireless emitters 13 is associated with a different emitter identifier. Emitter identifiers may include, for example, a universally unique identifier (UUID) such as a MAC address, a SSID, a hash value (e.g., MD5, SHA-1, etc.), a random string, a device name, a serial number, or any other identifier capable of distinguishing between wireless emitters 13. In some embodiments, each of wireless emitters 13 is associated with multiple different emitter identifiers. For example, a wireless emitter may be associated with a UUID value, a minor value, and a major value. Each of wireless emitters 13 may be configured to broadcast one or more emitter identifiers as part of a wireless signal.

Figure 3:
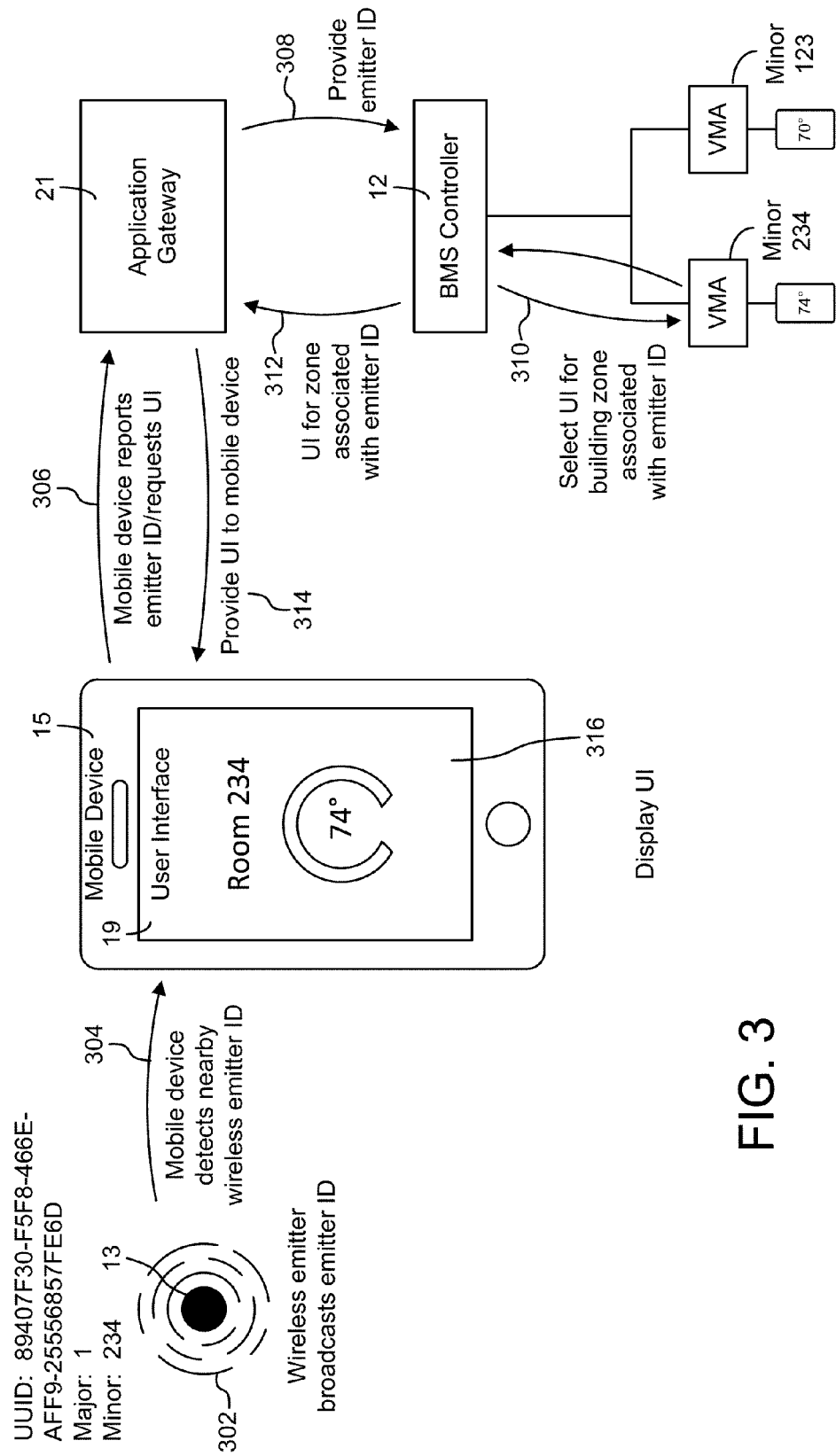
FIG. 3 is a flow diagram illustrating a process for determining the location of a mobile device in the building of FIG. 1 using the plurality of wireless emitters and an application running on the mobile device, according to an exemplary embodiment.

Referring now to FIG. 3, a flow diagram illustrating a process 300 for using occupant location in a building management system is shown, according to an exemplary embodiment. A building (e.g., building 10) is equipped with a plurality of wireless emitters 13. Each of wireless emitters 13 may be located at a different position in the building and may be associated with a different emitter identifier. Although only one wireless emitter 13 is shown in FIG. 3, many wireless emitters 13 may be placed at various locations in or around the building. Each of wireless emitters 13 broadcasts a wireless signal (step 302). The wireless signal broadcast by emitter 13 includes an indication of an emitter identifier associated with wireless emitter 13. In some embodiments, the wireless signal broadcast by emitter 13 include multiple emitter identifiers (e.g., a UUID value, a major value, a minor value, etc.)

Still referring to FIG. 3, a mobile device 15 detects the wireless signal emitted by wireless emitter 13 (step 304). Mobile device 15 may be, for example, a laptop computer, a tablet, a smart phone, a RFID sensor, a Bluetooth device, a WiFi device, a NFC device, a portable communications device, or any combination thereof. Mobile device 15 may be configured to run remote applications 18 and may function as a UI client 16, as described with reference to FIG. 2. Mobile device 15 may be configured (e.g., by an application running on mobile device 15) to identify the emitter identifier associated with the wireless signal detected in step 304.

In FIG. 3, mobile device 15 is shown connecting to an application gateway 21 (e.g., at a predefined IP address, via a wireless data connection) and reporting the emitter identifier associated with the detected wireless signal (step 306). In some embodiments, mobile device 15 requests a user interface for presentation on mobile device 15. The request may include the emitter identifier detected by mobile device 15 and/or a device identifier associated with mobile device 15. Application gateway 21 may provide the emitter identifier and/or the device identifier to BMS controller 12 or another component of BMS 11 (step 308). In various embodiments, application gateway 21 and BMS controller 12 may be combined into a single component or mobile device 15 may report the emitter identifier directly to BMS controller 12.

BMS controller 12 uses the emitter identifier and/or the device identifier to select a user interface for presentation on mobile device 15 (step 310). BMS controller 12 may select the user interface for a building zone associated with the emitter identifier reported by mobile device 15. For example, BMS controller 12 may select a user interface which includes information and/or control options relating to the building zone associated with the reported emitter identifier. In some embodiments, BMS controller 12 selects a user interface based on the identity of a user associated with mobile device 15 (e.g., based on a user identifier or device identifier reported by mobile device 15). In some embodiments, BMS controller 12 uses emitter identifier reported by mobile device 15 to determine the position of mobile device 15 within the building. BMS controller 12 may select a user interface for monitoring and/or controlling the building zone in which mobile device 15 is currently located or a building zone in which mobile device 15 has been located previously.

Still referring to FIG. 3, BMS controller 12 is shown providing the selected user interface to application gateway 21 (step 312), which provides the selected user interface to mobile device 15 (step 314). In other embodiments, BMS controller 12 may provide the selected user interface directly to mobile device 15. Mobile device 15 may present the selected user interface on user interface 19 (step 316). User interface 19 may be, for example, an electronic display or other user interface element of mobile device 15. Advantageously, BMS controller 12 may automatically detect the location of mobile device 15 and deliver a location-specific user interface to mobile device 15 without requiring a user to input location information.

Figure 4:
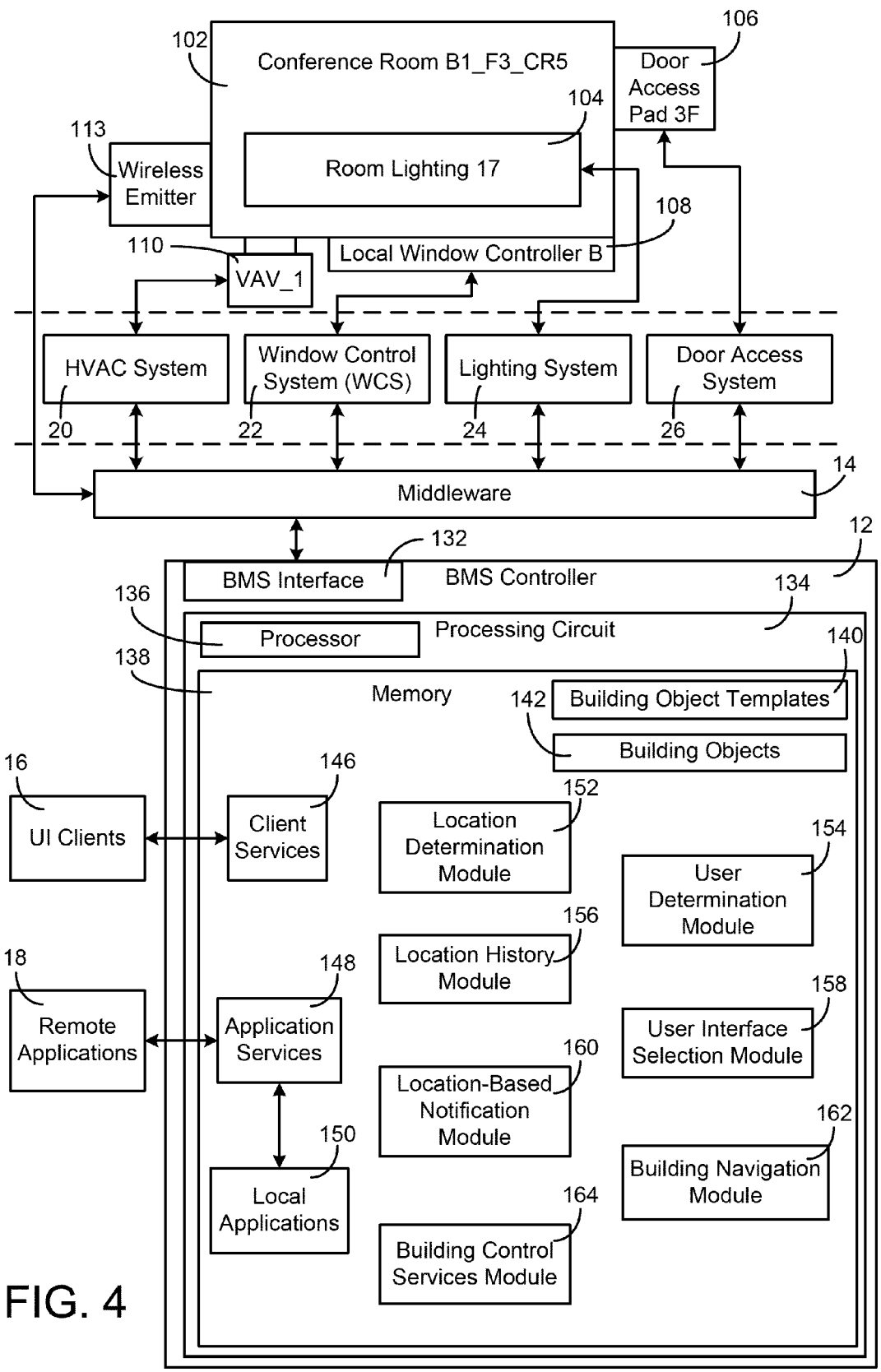
FIG. 4 is a block diagram illustrating a portion of the building management system of FIG. 2 in greater detail, according to an exemplary embodiment.

Referring now to FIG. 4, a block diagram illustrating a portion of BMS 11 in greater detail is shown, according to an exemplary embodiment. Particularly, FIG. 4 illustrates a portion of BMS 11 that services a conference room 102 of building 10 (named "B1_F3_CR 5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 4 may include local control circuitry configured to provide signals to their supervisory controllers or more generally to the BMS subsystems 20-26. The local control circuitry of the building devices shown at the top of FIG. 4 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 4, a wireless emitter 113 is shown located in proximity to conference room 102. In various embodiments, wireless emitter 113 may be located within conference room 102 (e.g., attached to a wall or ceiling, integrated with other BMS devices, etc.) or outside conference room 102 (e.g., in a hallway, in an adjacent room in the same zone, etc.). Wireless emitter 113 may be associated with conference room 102 by BMS controller 12. For example, BMS controller 12 may manage a relational database which associates each of wireless emitters 13 with a particular room or building zone. BMS controller 12 may be configured to provide a mobile device near wireless emitter 113 (e.g., a mobile device within or close to conference room 102) with a location-specific user interface for controlling and/or monitoring inputs from the various BMS devices associated with conference room 102.

Still referring to FIG. 4, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a WiFi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes a mobile application gateway (e.g., application gateway 21, as described with reference to FIG. 3) configured to receive input from mobile devices 15. For example, BMS interface 132 and/or middleware 14 may include one or more wireless transceivers (e.g., a WiFi transceiver, a Bluetooth transceiver, a NFC transceiver, a cellular transceiver, etc.) for communicating with mobile devices 15. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 4, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 4, memory 138 is shown to include building objects 142 and building object templates 140. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). In some embodiments, BMS controller 12 creates and/or stores a building object in memory 138 for each zone or room of building 10. Each of building objects 142 may include the same or similar attributes, properties, and/or method names. For example, each of building objects 142 may include a variable air volume box attribute, a window attribute, a lighting attribute, a door access device attribute, a temperature attribute, a security level attribute, an occupancy attribute, a setpoint attribute, or any other type of attribute. Building objects 142 can be accessed by UI clients 16 and remote applications 18 to provide a comprehensive user interface for controlling and/or viewing information for a particular building zone.

Building object templates 142 may be used to construct building objects of predefined types. For example, building object templates 140 may contain a "Conference Room" template that can be used to define conference room objects in building objects 142. To create a building object for conference room 102, inputs from building management resources may be mapped (e.g., linked, associated, described, grouped) to attributes of the building object. For example, BMS controller 12 may group inputs from the various subsystems 20-26 to create a building object "Conference_Room.B1_F3_CR5" for conference room 102. An exemplary building object for conference room 102 might be an object such as:

```
Conference_Room.B1_F3_CR5 {
    vav: //Middleware/HVAC_System_A/VAV_1;
    window: //Middleware/WCS/WindowControllerB;
    lighting: //Middleware/LightingSystem/RL12;
    door_access: //Middleware/AccessSys/DAP3F;
}
```

The exemplary building object provided above is named "Conference_Room.B1_F3_CR5," which may conform to a naming convention indicating that it is a conference room in a particular location in the building (e.g. Conference Room 5 on Floor 3 of Building 1). The building object "Conference_Room.B1_F3_CR5" has several values or attributes including vav, window, lighting, and door_access. The attributes of vav, window, lighting, and door_access are mapped to the particular BMS resources of "HVAC_System_A/VAV_1," "WCS/WindowControllerB," "LightingSystem/RL12," and "AccessSys/DAP3F," respectively. The mapping provides a description for BMS or computing resources (e.g., back end software applications, client applications, BMS control routines, etc.) so that the BMS or other computing resources can identify, access, display, change or otherwise interact with the software defined building object in a meaningful way (e.g., in a way that allows changes to be made to the mapped devices).

Building objects 142 may be mapped to BMS inputs manually or automatically. For example, the mapping may be completed by a user with a graphical user interface tool that requires a user to either type in or "drag and drop" BMS inputs to an object. Building objects 142 may also or alternatively be mapped to BMS inputs by computerized systems configured to provide varying degrees of mapping automation. For example, patent application Ser. No. 12/887,390, filed Sep. 21, 2010, describes systems and methods for creating software defined building objects and mapping BMS inputs to the building objects. Once building objects 142 are created and BMS devices or inputs are mapped thereto, building objects 142 may be used by applications (e.g., local applications, remote applications, etc.) with any suitable programming language or syntax.

Still referring to FIG. 4, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices 15 and/or with other BMS controllers.

In some embodiments, application services 148 facilitate an applications gateway (e.g., applications gateway 21) for conducting electronic data communications with UI clients 16 and/or remote applications 18. For example, application services 148 may be configured to receive communications (e.g., detected emitter identifiers) from applications running on mobile devices 15 (e.g., remote applications 18). In some embodiments, application services 148 are configured to receive a request for a user interface for presentation on a mobile device. The request may include an emitter identifier associated with one of the plurality of wireless emitters 13 detected by the mobile device. Client services 146 may provide mobile devices 15 with a location-specific user interface (e.g., based on the emitter identifier) in response to the request.

Still referring to FIG. 4, memory 138 is shown to include a location determination module 152. Location determination module 152 may be configured to determine the location of a mobile device in or around building 10. In some embodiments, location determination module 152 determines the location of a mobile device based on information received from the mobile device. For example, location determination module 152 may receive one or more emitter identifiers reported by the mobile device (e.g., detected and reported by an application executing on the mobile device). The emitter identifiers may indicate which of a plurality of wireless emitters 13 are nearby (e.g., within range of) the mobile device.

In other embodiments, location determination module 152 determines the location of a mobile device based on data information from other data sources. For example, in some embodiments mobile devices 15 may be equipped with a RFID tag or transponder. Sensors placed at various locations in or around building 10 may detect the position of a mobile device. In some embodiments, wireless emitters 13 are capable of detecting a wireless signal (e.g., an active signal, a passive signal, etc.) from mobile devices 15. Wireless emitters 13 may communicate with BMS controller 12 to provide location determination module 152 with location information for mobile devices 15. Location determination module 152 may use sensor information (e.g., detected mobile device information) from wireless emitters 13 to determine the locations of mobile devices 15.

Location determination module 152 may receive a single emitter identifier from a mobile device or multiple emitter identifiers from the mobile device. For example, a mobile device may report the emitter identifier associated with each wireless signal (e.g., from one of wireless emitters 13) that is detected by the mobile device. If the mobile device is within range of multiple wireless emitters 13, the mobile device may report multiple emitter identifiers. For embodiments in which mobile devices 15 report multiple emitter identifiers, each emitter identifier may be reported in conjunction with a signal strength. The signal strength associated with an emitter identifier may indicate a relative proximity of the mobile device to the corresponding wireless emitter (e.g., high signal strengths indicating a closer proximity and low signal strengths indicating a more distant proximity).

Location determination module 152 may determine the location a mobile device based on the emitter identifier or emitter identifiers received from the mobile device. In some embodiments, location determination module 152 uses the emitter identifier(s) received from a mobile device to determine which of the plurality of wireless emitters is closest to the mobile device (e.g., based on signal strength, triangulation, etc.). For example, location determination module 152 may use an emitter identifier received from a mobile device as an input to a relational database (e.g., a lookup table, a device mapping, etc.). Each emitter identifier may uniquely indicate a particular wireless emitter (e.g., by emitter device name, by serial number, etc.) and/or a particular location (e.g., a zone name, a zone identifier, etc.) in the relational database.

In some embodiments, location determination module 152 identifies a building zone associated with an emitter identifier received from the mobile device. Relationships between emitter identifiers and building zones may be stored in memory 138 (e.g., in a database, in a table, etc.). Location determination module 152 may use the emitter identifier received from a mobile device as an input to determine a corresponding building zone. The building zone associated with an emitter identifier may be a building zone in which the associated wireless emitter is located or a building zone located proximate to the associated wireless emitter. Location determination module 152 may provide the location of various mobile devices 15 to one or more of location history module 156, location-based notification module 160, building navigation module 162, building control services module 164, and user interface selection module 158, described in greater detail below.

Still referring to FIG. 4, memory 138 is shown to include a user determination module 154. User detection module 154 may be configured to identify a user associated with an emitter identifier report received from a mobile device. The user associated with an emitter identifier report may be, for example, a user of the mobile device from which the emitter identifier is reported. In some embodiments, mobile devices 15 report a device identifier (e.g., a MAC address, an IP address, a device name, etc.) and/or user identifier (e.g., a user name, a login ID, a user group, etc.) in conjunction with the emitter identifier. User determination module 154 may use the device identifier and/or user identifier to identify a particular user or user account associated with the mobile device.

Different users may have different permissions and/or authorities for monitoring or controlling conditions within building 10. For example, a system administrator or service technician may have be authorized to adjust setpoint parameters whereas other users may not have such authority. The identity of the user associated with the emitter identifier report received from a mobile device may be used to select a user interface with appropriate control options (e.g., control options matching the user's permission level) to provide to the mobile device.

In some embodiments, the user identity determined by user determination module 154 may be used to automatically adjust control parameters for the corresponding building zone (e.g., the zone in which the user is located). For example, a user's identity may be used to identify the user's preferred environment conditions (e.g., temperature conditions, air flow conditions, etc.) for a building zone. When the user enters a building zone, the identity of the user may be used (e.g., by building control services module 164) to automatically adjust control setpoints (e.g., temperature setpoints, flow rate setpoints, etc.) for the building zone to the user's preferred values. In some embodiments, if two or more users with conflicting preferences are located within the same building zone, the user identities determined by user determination module 154 may be used to select one set of preferred control parameters over another (e.g., based on user authority levels, based on which user is higher ranking in an organization, etc.).

Still referring to FIG. 4, memory 138 is shown to include a location history module 156. Location history module 156 may be configured to manage a location history for mobile devices 15. A location history for a particular mobile device may include a series of locations (e.g., determined by location determination module 152) at which the mobile device has been located in the past. Location history module 156 may record the locations determined by location determination module 152 for each of mobile devices 15 in a database such that a location history for a particular mobile device can be constructed.

The location history for a mobile device may allow a user to control or monitor conditions within a particular room or zone in which the mobile device was previously located, even if the mobile device is not currently in the room or zone. For example, the location history for a mobile device may be used to provide a user with a list of control interfaces from which the user can select for presentation on the mobile device. Each control interface may correspond to a building zone in which the mobile device was previously located or is currently located. This feature allows a user to readily select a control interface for a recently-visited building zone (e.g., within a predetermined time period, within a threshold number of most recently-visited locations, etc.) regardless of whether the mobile device is currently located within the building zone.

In some embodiments, location history module 156 stores each location in the location history with a corresponding time parameter. For example, location history module 156 may store each location determined by location determination module 152 as an event. Each event may include a location parameter (e.g., identifying a particular building zone), a time parameter (e.g., identifying a time at which the mobile device was located within the building zone), and a device ID parameter or user ID parameter (e.g., indicating a particular user or a particular mobile device). By storing each location as an event, location history module 156 can maintain a historical record of the location of a mobile device (and a user associated therewith) over a period of time.

In some embodiments, location history module 156 may be configured to use the location history for a mobile device to reconstruct a route that the mobile device travels within building 10. For example, location history module 156 can use the location history for a mobile device assigned to security personnel to determine whether the building personnel have physically traveled to various locations within building 10 at the appropriate times (e.g., for performing security checks, for personnel management, for responding to emergencies, etc.). As another example, the location history for a mobile device may allow a user's route from one building zone to another building zone to be reconstructed. This feature may be useful for providing navigation instructions (e.g., directions from one room in the building to another) for situations in which a user is not familiar with a layout of the building. The location history for a mobile device may also be used in the event of an emergency (e.g., a fire or fire drill) to determine whether all personnel who entered the building on a particular day (e.g., the day of the emergency) have been safely evacuated.

Still referring to FIG. 4, memory 138 is shown to include a user interface selection module 158. User interface selection module 158 may be configured to select a user interface for presentation on mobile devices 15. In some embodiments, user interface selection module 158 selects a user interface for a mobile device based on a location (e.g., a current location, a previous location, a predicted location, etc.) of the mobile device. User interface selection module 158 may receive the current location of a mobile device (e.g., an indication of a particular room or building zone) from location determination module 152. In some embodiments, user interface selection module 158 selects a user interface for monitoring and/or controlling a building zone in which the mobile device is currently located (as indicated by location determination module 152) or has been located in the past (as indicated by location history module 156).

In some embodiments, user interface selection module 158 receives an indication of an emitter identifier reported by the mobile device. User interface selection module 158 may use the emitter identifier to select a user interface for a building zone associated with the emitter identifier. For example, user interface selection module 158 may select a user interface for a building zone in which a wireless emitter associated with the emitter identifier is located. In some embodiments, user interface selection module 158 selects a user interface based primarily on the emitter identifier. For example, each emitter identifier may be associated directly with a particular user interface (e.g., in a table or relational database). In some embodiments, user interface selection module 158 selects a user interface that is associated directly with the reported emitter identifier without relying on further information regarding the location of the mobile device.

User interface selection module 158 may select (e.g., configure, arrange, determine, choose, etc.) a local control interface for a building zone associated with the emitter identifier. The local control interface may include an interface option for controlling a variable state or condition of the building zone associated with the emitter identifier. The local control interface may allow a user to adjust environmental conditions within a particular building zone. For example, a local control interface for conference room 102 shown in FIG. 4 may provide an interface option for adjusting a temperature setpoint used by HVAC system 20 to control the temperature of conference room 102. As another example, a local control interface for conference room 102 may provide interface options for adjusting a damper position of "VAV_1" 110, opening or closing windows or shades via "Local Window Controller B" 108, turning on or off "Room Lighting 17" 104, or adjusting security options for accessing conference room 102 via "Door Access Pad 3F" 106.

User interface selection module 158 may determine which control options to include in a user interface for a building zone by identifying attributes of a building object (e.g., one of building objects 142) corresponding to the building zone. For example, for conference room 102, user interface selection module 158 may identify the building object corresponding to conference room 102 (i.e., building object "B1_F3_CR5") in building objects 142. User interface selection module 158 may identify one or more attributes of the building object (e.g., vav, temperature setpoint, window, lighting, door access, etc.) as potential interface options which can be manipulated via the user interface for conference room 102. Each of the control options included in the interface for a building zone may map to a particular BMS device defined in the building object associated with the building zone.

In some embodiments, user interface selection module 158 determines whether to include control options for particular building equipment in a user interface provided to a mobile device based on the proximity of the mobile device to the particular building equipment. For example, some building equipment may be dangerous or hazardous to users located in proximity thereto and may require that users be separated from the building equipment by a minimum distance before the equipment can be operated. User interface selection module 158 may allow a mobile device to control such equipment (e.g., by providing corresponding user interface options) only if the mobile device is separated from the building equipment by the minimum distance. User interface selection module 158 may also enforce maximum safe distances by preventing a mobile device from controlling building equipment unless the mobile device is within a maximum distance of the building equipment. This requirement may prevent users from blindly starting potentially dangerous equipment without being aware of conditions around the equipment.

In some embodiments, user interface selection module 158 selects a user interface which includes display data based on a variable state or condition of the building zone associated with the emitter identifier reported by the mobile device. The selected user interface may be a local control interface (e.g., with control options) or an informational interface (e.g., without control options). For example, user interface selection module 158 may select a user interface which allows a user to monitor environmental conditions within a particular building zone without allowing conditions to be adjusted.

In some embodiments, user interface selection module 158 receives an indication of a user identifier and/or a device identifier associated with the emitter identifier reported by the mobile device. For example, user interface selection module 158 may receive an indication of a particular user or user group associated with the mobile device from which the emitter identifier is reported (e.g., from user determination module 154). User interface selection module 158 may use the identity of the user to which the user interface will be presented to determine which of a plurality of potential control options and/or display options to include in the user interface.

Different users may have different permissions and/or authorities for monitoring or controlling conditions within building 10. For example, a system administrator or service technician may have be authorized to adjust setpoint parameters whereas other users may not have such authority. User interface selection module 158 may use the identity of a user to select a user interface with appropriate control options (e.g., control options matching the user's permission level) to provide to the mobile device. In some embodiments, user interface selection module 158 uses the identity of a user associated with the mobile device to select information for presentation on the mobile device. For example, if the user of the mobile device is a service technician, user interface selection module 158 may include detailed device information (e.g., device identity information, service history information, etc.) for BMS devices associated with the building zone.

In some embodiments, user interface selection module 158 provides mobile devices 15 with an initial user interface through which a selection of one or more building zones can be made (e.g., by a user). User interface selection module 158 may populate a list of building zones from which the selection can be made via the initial interface using a set of building zones in which the mobile device has been previously located or is currently located (e.g., using location information from location determination module 152 and/or location history module 156). Upon receiving a user selection of a building zone, user interface selection module 158 may select (e.g., arrange, configure, generate, etc.) a user interface for monitoring and/or controlling the selected building zone.

Still referring to FIG. 4, memory 138 is shown to include a location-based notification module 160. Location-based notification module 160 may be configured to provide notifications (e.g., messages, alerts, information, etc.) to mobile devices 15 based on the location of mobile devices 15 within building 10. For example, if a hazardous condition (e.g., a fire, a chemical spill, a security event, etc.) is detected in building 10, location-based notification module 160 may send a notification to mobile devices 15 that may be affected by the hazardous condition based on the location of mobile devices 15 (e.g., evacuation instructions, response instructions, etc.).

Location-based notification module 160 may receive device location information from location determination module 152 and/or user identity information from user determination module 154. Location-based notification module 160 may generate and/or distribute customized notifications to mobile devices 15 based on the locations of mobile devices 15 and/or the identities of users associated with mobile devices 15. For example, if a security event is detected in building 10 (e.g., an unauthorized entry), location-based notification module 160 may send a customized notification to security personnel with specific instructions for handling the security event. The instructions provided to mobile devices associated with security personnel may be based on the locations of the mobile devices with respect to the security event. For example, security personnel located close to the event may receive a first set of instructions, whereas security personnel located further from the event may receive a second set of instructions. Additionally, the instructions provided to mobile devices associated with security personnel may be different than the instructions provided to mobile devices associated with other building occupants.

Still referring to FIG. 4, memory 138 is shown to include a building navigation module 162. Building navigation module 162 may be configured to generate navigation information for a mobile device based on the location of the mobile device within building 10. For example, building navigation module 162 may generate display data for presentation on a mobile device which includes a map of building 10. Building navigation module 162 may receive location information from location determination module 152 and use the location information to mark the location of the mobile device on the map. Advantageously, the information generated by building navigation module 162 may facilitate intra-building navigation of building 10 (e.g., navigation between rooms or zones of a building).

In some embodiments, building navigation module 162 generates navigation instructions. For example, building navigation module 162 may generate directions for traveling from one room or zone of building 10 to another room or zone of building 10. The directions generated by building navigation module 162 may be similar to driving directions generated by a GPS navigation unit. However, the directions generated by building navigation module 162 may be based on the layout of building 10 and the location of mobile devices 15 with respect to wireless emitters 13. This feature may be useful for facilitating navigation within building 10 for users who are not familiar with a layout of the building.

In some embodiments, building navigation module 162 generates a user interface for presentation on a mobile device which includes a highlighted route from a current location of the mobile device (e.g., determined by location determination module 152) to a destination location (e.g., provided or selected by a user). The destination location may be selected from a list of previous locations of the mobile device or may be provided by a user. For example, a user may select or input the name or number of a particular room or zone of building 10 into a mobile device. Building navigation module 162 may use the current location of the mobile device to generate navigation instructions (e.g., step-by-step instructions, a highlighted route, an interactive map, etc.) for traveling from the current location of the mobile device to the destination location provided and/or selected by the user.

Still referring to FIG. 4, memory 138 is shown to include a building control services module 164. Building control services module 164 may be configured to automatically control BMS 11 and the various subsystems thereof. Building control services module 164 may utilize closed loop control, feedback control, PI control, model predictive control, or any other type of automated building control methodology to control the environment (e.g., a variable state or condition) within building 10.

Building control services module 164 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 164 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 164 is configured to control the environment of building 10 on a zone-individualized level. For example, building control services module 164 may control the environment of two or more different building zones using different setpoints, different constraints, different control methodology, and/or different control parameters. Building control services module 164 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 164 uses the location of various mobile devices 15 and/or the identity of users associated with mobile devices 15 to translate an input received from a building system into an output or control signal for the building system. For example, building control services module 164 may receive location information for mobile devices 15 from location determination module 152. Building control services module 164 may determine a total number of mobile devices (and corresponding occupants) in a building zone based on the locations of mobile devices 15. In some embodiments, building control services module 164 controls the environment of a building zone based on an estimated number of occupants in the building zone. For example, a large number of occupants in a building zone may cause building control services module 164 to increase air flow to a building zone to recycle air more quickly.

In some embodiments, building control services module 164 receives identity information from user determination module 154. Building control services module 164 may use the identity information in conjunction with the mobile device location information to determine the identities of occupants in each of a plurality of building zones. Building control services module 164 may use the location information and/or the identity information to automatically adjust control parameters for various building zones.

In some embodiments, building control services module 164 uses the identity information for a user associated with a mobile device to identify the user's preferred environment conditions (e.g., temperature conditions, air flow conditions, etc.) for a building zone. When the user (or mobile device associated with the user) enters a building zone, building control services module 164 may automatically adjust control setpoints (e.g., temperature setpoints, flow rate setpoints, etc.) for the building zone to the user's preferred values. In some embodiments, if two or more users with conflicting preferences are located within the same building zone, building control services module 164 may use the user identities (determined by user determination module 154) to select one set of preferred control parameters over another (e.g., based on user authority levels, based on which user is higher ranking in an organization, etc.).

Figure 5:
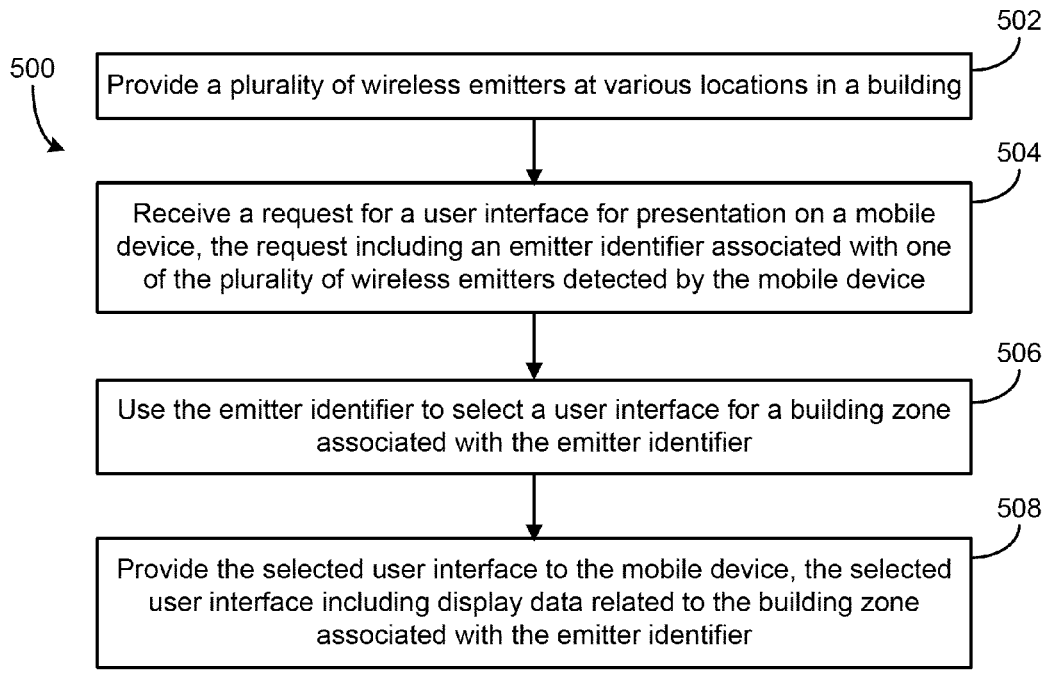
FIG. 5 is a flowchart of a process for providing a location-based user interface to a mobile device in a building management system, according to an exemplary embodiment.

Referring now to FIG. 5, a flowchart of a process 500 for providing a location-based user interface to a mobile device is shown, according to an exemplary embodiment. Process 500 may be performed by BMS 11 using BMS controller 12 as described with reference to FIGS. 2-4. Process 500 is shown to include providing a plurality of wireless emitters in a building (step 502). Each of the wireless emitters (e.g., wireless emitters 13) may be located at a different position in the building and may be associated with a different emitter identifier. For example, the wireless emitters may be positioned at various locations within or around the building (e.g., inside rooms or zones, at entrance/exit points, in hallways, etc.).

The wireless emitters may be configured to emit, receive, sense, relay, or otherwise engage in unidirectional or bidirectional wireless communications. The wireless emitters may use any type wireless technology or communications protocol. For example, in various embodiments, the wireless emitters may be Bluetooth low energy (BLE) emitters, near field communications (NFC) devices, WiFi transceivers, RFID devices, ultrawide band (UWB) devices, infrared emitters/sensors, visible light communications (VLC) devices, ultrasound devices, cellular transceivers, or any other type of hardware configured to facilitate wireless data communications. In some embodiments, the wireless 13 may be integrated with existing BMS devices within the building (e.g., thermostats, lighting sensors, zone controllers). In some embodiments, each of the wireless emitters broadcasts (e.g., emits, provides, outputs, etc.) a wireless signal that includes an emitter identifier.

The wireless signals broadcast by the wireless emitters may be detected by various mobile devices (e.g., mobile devices 15) in or around the building. The mobile devices may include, for example, laptop computers, tablets, smart phones, RFID sensors, Bluetooth devices, WiFi devices, NFC devices, portable communications devices, or any combination thereof. The mobile devices may be configured (e.g., by an application running on the mobile devices) to identify the emitter identifier associated with detected wireless signals and to report detected emitter identifiers to the BMS (e.g., via a mobile applications gateway).

Still referring to FIG. 5, process 500 is shown to include, receiving a request for a user interface for presentation on a mobile device (step 504). The request for a user interface may be received at a processing circuit of the building management system. The request for a user interface may be received from a mobile device (e.g., directly or via an applications gateway). For example, mobile devices may actively detect wireless signals and submit requests to the BMS. In some embodiments, the request for a user interface includes an emitter identifier associated with one of the plurality of wireless emitters detected by the mobile device. The mobile device may detect and/or report one or more emitter identifiers using an application running on the mobile device. The emitter identifiers may indicate which of the plurality of wireless emitters are nearby (e.g., within range of) the mobile device.

In various embodiments, step 504 may include receiving a single emitter identifier from a mobile device or multiple emitter identifiers from the mobile device. For example, a mobile device may report the emitter identifier associated with each wireless signal (e.g., from one or more of the wireless emitters) that is detected by the mobile device. If the mobile device is within range of multiple wireless emitters, the mobile device may report multiple emitter identifiers. For embodiments in which the mobile device reports multiple emitter identifiers, each emitter identifier may be reported in conjunction with a signal strength. The signal strength associated with an emitter identifier may indicate a relative proximity of the mobile device to the corresponding wireless emitter (e.g., high signal strengths indicating a closer proximity and low signal strengths indicating a more distant proximity).

In some embodiments, the request for a user interface includes a device identifier (e.g., a MAC address, an IP address, a device name, etc.) and/or a user identifier (e.g., a user name, a login ID, a user group, etc.). The device identifier and/or user identifier may be used to identify a particular device, a particular user, a particular account, or a particular group associated with the mobile device.

In some embodiments, step 504 includes storing the emitter identifiers reported by a mobile device. Each emitter identifier may be stored with a corresponding time parameter. For example, step 504 may include storing each emitter identifier received from a mobile device as an event. Each event may include a location parameter (e.g., identifying a particular emitter identifier and/or a particular building zone), a time parameter (e.g., identifying a time at which the mobile device was located within the building zone), and a device ID parameter or user ID parameter (e.g., indicating a particular user or a particular mobile device). By storing each location as an event, a historical record can be maintained of the location of a mobile device (and a user associated therewith) over a period of time.

Still referring to FIG. 5, process 500 is shown to include using the emitter identifier to select a user interface for a building zone associated with the emitter identifier (step 506). In some embodiments, step 506 is performed by user interface selection module 158, as described with reference to FIG. 4. For example, step 506 may include selecting a user interface for a building zone in which a wireless emitter associated with the emitter identifier is located. In some embodiments, step 506 includes selecting a user interface based primarily on the emitter identifier. For example, each emitter identifier may be associated directly with a particular user interface (e.g., in a table or relational database). In some embodiments, step 506 includes selecting a user interface that is associated directly with the reported emitter identifier without relying on further information regarding the location of the mobile device.

In some embodiments, step 506 includes selecting a user interface for a mobile device based on a location (e.g., a current location, a previous location, a predicted location, etc.) of the mobile device. For example, step 506 may include using the emitter identifier to determine a building zone in which the mobile device is located and selecting a user interface associated with the building zone in which the mobile device is located. In some embodiments, user interface selection module 158 selects a user interface for monitoring and/or controlling a building zone in which the mobile device is currently located or has been located in the past.

Step 506 may include selecting (e.g., configuring, arranging, determining, choosing, etc.) a local control interface for a building zone associated with the emitter identifier. The local control interface may include an interface option for controlling a variable state or condition of the building zone associated with the emitter identifier. The local control interface may allow a user to adjust environmental conditions within a particular building zone.

Step 506 may include determining which control options to include in a user interface for a building zone by identifying attributes of a building object (e.g., one of building objects 142) corresponding to the building zone. Step 506 may include identifying one or more attributes of the building object (e.g., vav, temperature setpoint, window, lighting, door access, etc.) as potential interface options which can be manipulated via the user interface for the corresponding building zone. Each of the control options included in the interface for a building zone may map to a particular BMS device defined in the building object associated with the building zone.

In some embodiments, step 506 includes determining whether to include control options for particular building equipment in a user interface provided to a mobile device based on the proximity of the mobile device to the particular building equipment. For example, some building equipment may be dangerous or hazardous to users located in proximity thereto and may require that users be separated from the building equipment by a minimum distance before the equipment can be operated. Step 506 may include selecting a user interface which allows a mobile device to control such equipment (e.g., by providing corresponding user interface options) only if the mobile device is separated from the building equipment by the minimum distance. In some embodiments, step 506 includes selecting a user interface which enforces maximum safe distances by preventing a mobile device from controlling building equipment unless the mobile device is within a maximum distance of the building equipment. This requirement may prevent users from blindly starting potentially dangerous equipment without being aware of conditions around the equipment.

In some embodiments, step 506 includes selecting a user interface which includes display data based on a variable state or condition of the building zone associated with the emitter identifier reported by the mobile device. The selected user interface may be a local control interface (e.g., with control options) or an informational interface (e.g., without control options). For example, step 506 may include selecting a user interface which allows a user to monitor environmental conditions within a particular building zone without allowing conditions to be adjusted.

In some embodiments, step 506 includes using the identity of the user to which the user interface will be presented to determine which of a plurality of potential control options and/or display options to include in the user interface. Different users may have different permissions and/or authorities for monitoring or controlling conditions within the building. For example, a system administrator or service technician may have be authorized to adjust setpoint parameters whereas other users may not have such authority. Step 506 may include using the identity of a user to select a user interface with appropriate control options (e.g., control options matching the user's permission level) to provide to the mobile device.

In some embodiments, step 506 includes using the identity of a user associated with the mobile device to select information for presentation on the mobile device. For example, if the user of the mobile device is a service technician, step 506 may include selecting a user interface which includes detailed device information (e.g., device identity information, service history information, etc.) for BMS devices associated with the building zone.

In some embodiments, step 506 includes selecting an initial user interface through which a user selection of one or more building zones can be made. The initial user interface may be populated with a list of building zones in which the mobile device has been previously located or is currently located. In response to a user selection of a building zone via the initial user interface, step 506 may include selecting (e.g., arrange, configure, generate, etc.) a user interface for monitoring and/or controlling the selected building zone.

Still referring to FIG. 5, process 500 is shown to include providing the selected user interface to the mobile device (step 508). The selected user interface may include display data related to the building zone associated with the emitter identifier. The selected user interface may be a local control interface (e.g., with control options) or an informational interface (e.g., without control options). Advantageously, the selected user interface may facilitate monitoring and/or control of a particular building zone via a mobile device (e.g., a building zone in which the mobile device is located) without requiring the user to input location information. The location of the mobile device may be automatically detected and used to select a user interface for presentation on the mobile device.

Figure 6:
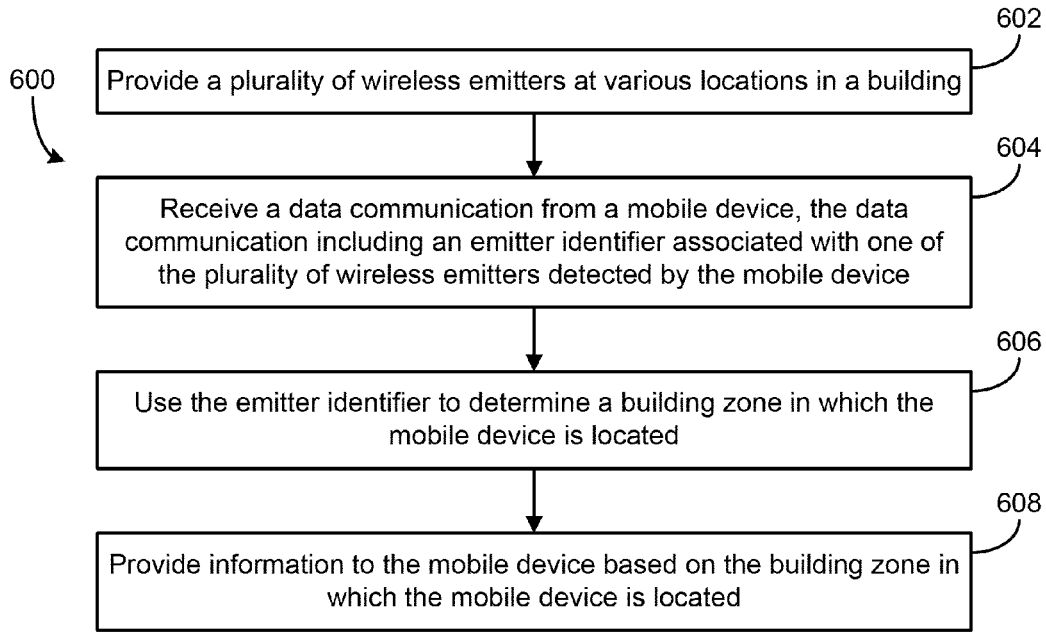
FIG. 6 is a flowchart of a process for providing location-based information to a mobile device in a building management system, according to an exemplary embodiment.

Referring now to FIG. 6, a flowchart of a process 600 for providing location-based information to a mobile device in a building management system is shown, according to an exemplary embodiment. Process 600 may be performed by BMS 11 using BMS controller 12 as described with reference to FIGS. 2-4. Process 600 is shown to include providing a plurality of wireless emitters in a building (step 602). Each of the wireless emitters (e.g., wireless emitters 13) may be located at a different position in the building and may be associated with a different emitter identifier. For example, the wireless emitters may be positioned at various locations within or around the building (e.g., inside rooms or zones, at entrance/exit points, in hallways, etc.). Step 602 may be the same or similar to step 502 of process 500.

Still referring to FIG. 6, process 600 is shown to include receiving a data communication from a mobile device, the data communication including an emitter identifier associated with one of the plurality of wireless emitters detected by the mobile device (step 604). The emitter identifier may be received at a processing circuit of the building management system. The emitter identifier may be received from a mobile device (e.g., directly or via an applications gateway). For example, mobile devices may actively detect wireless signals and report detected emitter identifiers to the BMS using an application running on the mobile device. The emitter identifiers may indicate which of the plurality of wireless emitters are nearby (e.g., within range of) the mobile device.

In various embodiments, step 604 may include receiving a single emitter identifier from a mobile device or multiple emitter identifiers from the mobile device. For example, a mobile device may report the emitter identifier associated with each wireless signal (e.g., from one or more of the wireless emitters) that is detected by the mobile device. If the mobile device is within range of multiple wireless emitters, the mobile device may report multiple emitter identifiers. For embodiments in which the mobile device reports multiple emitter identifiers, each emitter identifier may be reported in conjunction with a signal strength. The signal strength associated with an emitter identifier may indicate a relative proximity of the mobile device to the corresponding wireless emitter (e.g., high signal strengths indicating a closer proximity and low signal strengths indicating a more distant proximity).

In some embodiments, step 604 includes receiving a device identifier (e.g., a MAC address, an IP address, a device name, etc.) and/or a user identifier (e.g., a user name, a login ID, a user group, etc.). The device identifier and/or user identifier may be used to identify a particular device, a particular user, a particular account, or a particular group associated with the mobile device from which the emitter identifier is reported.

Still referring to FIG. 6, process 600 is shown to include using the emitter identifier to determine a building zone in which the mobile device is located (step 606). In some embodiments, step 606 is performed by location determination module 152 as described with reference to FIG. 4. For example, step 606 may include using one or more emitter identifiers received from a mobile device to determine which of the plurality of wireless emitters is closest to the mobile device (e.g., based on signal strength, triangulation, etc.). An emitter identifier received from a mobile device may be used as an input to a relational database (e.g., a lookup table, a device mapping, etc.) to determine a building zone associated with the emitter identifier. For example, each emitter identifier may uniquely indicate a particular wireless emitter (e.g., by emitter device name, by serial number, etc.) and/or a particular location (e.g., a zone name, a zone identifier, etc.) in the relational database.

In some embodiments, step 606 includes identifying a building zone associated with an emitter identifier received from the mobile device. Relationships between emitter identifiers and building zones may be stored in memory (e.g., in a database, in a table, etc.). Step 606 may include using an emitter identifier received from a mobile device as an input to determine a corresponding building zone. The building zone associated with an emitter identifier may be a building zone in which the associated wireless emitter is located or a building zone located proximate to the associated wireless emitter.

Still referring to FIG. 6, process 600 is shown to include providing information to the mobile device based on the building zone in which the mobile device is located (step 608). In some embodiments, the information provided to the mobile device includes navigation information based on the location of the mobile device within the building. For example, the information provided to the mobile device may include a map of an interior of the building indicating a location of the mobile device on the map. Step 608 may include using the location of the mobile device to mark the location of the mobile device on the map. In some embodiments, the information provided to the mobile device includes directions from the building zone in which the mobile device is located to another building zone within the building. Advantageously, such navigation information may facilitate intra-building navigation of the building (e.g., navigation between rooms or zones of a building).

In some embodiments, step 608 includes generating navigation instructions. For example, step 608 may include generating directions for traveling from one room or zone of a building to another room or zone of the building. The directions generated in step 608 may be similar to driving directions generated by a GPS navigation unit. However, the directions generated in step 608 may be based on the layout of the building and the location of the mobile device with respect to the plurality of wireless emitters. This feature may be useful for facilitating navigation within a building for users who are not familiar with a layout of the building.

In some embodiments, step 608 includes generating a user interface for presentation on a mobile device which includes a highlighted route from a current location of the mobile device (determined in step 606) to a destination location (e.g., provided or selected by a user). The destination location may be selected from a list of previous locations of the mobile device or may be provided by a user. For example, a user may select or input the name or number of a particular room or zone of the building into a mobile device. Step 608 may include using the current location of the mobile device to generate navigation instructions (e.g., step-by-step instructions, a highlighted route, an interactive map, etc.) for traveling from the current location of the mobile device to the destination location provided and/or selected by the user.

In some embodiments, the information provided to the mobile device includes at least one of a location-based alert and a location-based notification. Step 608 may include providing notifications (e.g., messages, alerts, information, etc.) to the mobile device based on the location of the mobile device within the building. For example, if a hazardous condition (e.g., a fire, a chemical spill, a security event, etc.) is detected in the building, step 608 may include sending a notification to mobile devices that may be affected by the hazardous condition based on the locations of the mobile devices (e.g., evacuation instructions, response instructions, etc.).

In some embodiments, step 608 includes generating and/or distributing customized notifications to mobile devices based on the locations of the mobile devices and/or the identities of users associated with the mobile devices. For example, if a security event is detected in the building (e.g., an unauthorized entry), step 608 may include sending a customized notification to security personnel with specific instructions for handling the security event. The instructions provided to mobile devices associated with security personnel may be based on the locations of the mobile devices with respect to the security event. For example, security personnel located close to the event may receive a first set of instructions, whereas security personnel located further from the event may receive a second set of instructions. Additionally, the instructions provided to mobile devices associated with security personnel may be different than the instructions provided to mobile devices associated with other building occupants.

In some embodiments, the information provided to the mobile device is an initial user interface for selecting a building zone from a history of building zones in which the mobile device has been located. The initial user interface may be populated with a list of building zones in which the mobile device has been previously located or is currently located. In response to a user selection of a building zone via the initial user interface, step 608 may include providing the mobile device with a user interface for monitoring and/or controlling the selected building zone. In some embodiments, the information provided to the mobile device is a user interface for the building zone in which the user device is located.

Figure 7:
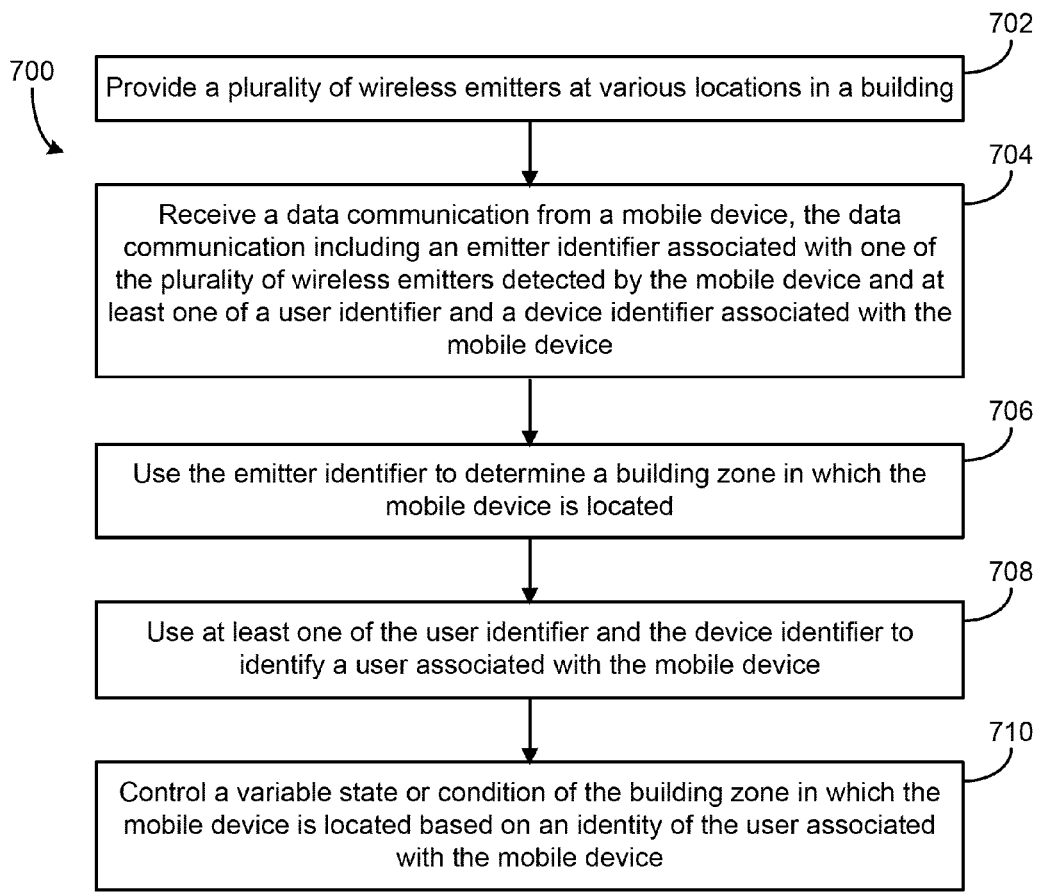
FIG. 7 is a flowchart of a process for providing location-based control in a building management system, according to an exemplary embodiment.

Referring now to FIG. 7, a flowchart of a process 700 providing location-based control in a building management system is shown, according to an exemplary embodiment. Process 700 may be performed by BMS 11 using BMS controller 12 as described with reference to FIGS. 2-4. Process 700 is shown to include providing a plurality of wireless emitters in a building (step 702). Each of the wireless emitters (e.g., wireless emitters 13) may be located at a different position in the building and may be associated with a different emitter identifier. For example, the wireless emitters may be positioned at various locations within or around the building (e.g., inside rooms or zones, at entrance/exit points, in hallways, etc.). Step 702 may be the same or similar to steps 502 and 602 of processes 500 and 600, respectively.

Still referring to FIG. 7, process 700 is shown to include receiving a data communication from a mobile device, the data communication including an emitter identifier associated with one of the plurality of wireless emitters detected by the mobile device and at least one of a user identifier and a device identifier associated with the mobile device (step 704). The emitter identifier may be received at a processing circuit of the building management system. The emitter identifier may be received from a mobile device (e.g., directly or via an applications gateway). For example, a mobile devices may actively detect wireless signals and report detected emitter identifiers to the BMS using an application running on the mobile device. The emitter identifiers may indicate which of the plurality of wireless emitters are nearby (e.g., within range of) the mobile device.

In various embodiments, step 704 may include receiving a single emitter identifier from a mobile device or multiple emitter identifiers from the mobile device. For example, a mobile device may report the emitter identifier associated with each wireless signal (e.g., from one or more of the wireless emitters) that is detected by the mobile device. If the mobile device is within range of multiple wireless emitters, the mobile device may report multiple emitter identifiers. For embodiments in which the mobile device reports multiple emitter identifiers, each emitter identifier may be reported in conjunction with a signal strength. The signal strength associated with an emitter identifier may indicate a relative proximity of the mobile device to the corresponding wireless emitter (e.g., high signal strengths indicating a closer proximity and low signal strengths indicating a more distant proximity).

The device identifier may be a MAC address, an IP address, a device name, or other identifier of a particular mobile device. The user identifier may be a user name, a login ID, a user group, or other identifier of a particular user or user group. The device identifier and/or user identifier may be used to identify a particular device, a particular user, a particular account, or a particular group associated with the mobile device from which the emitter identifier is received.

Still referring to FIG. 7, process 700 is shown to include using the emitter identifier to determine a building zone in which the mobile device is located (step 706). In some embodiments, step 706 is performed by location determination module 152 as described with reference to FIG. 4. For example, step 706 may include using one or more emitter identifiers received from a mobile device to determine which of the plurality of wireless emitters is closest to the mobile device (e.g., based on signal strength, triangulation, etc.). An emitter identifier received from a mobile device may be used as an input to a relational database (e.g., a lookup table, a device mapping, etc.) to determine a building zone associated with the emitter identifier. For example, each emitter identifier may uniquely indicate a particular wireless emitter (e.g., by emitter device name, by serial number, etc.) and/or a particular location (e.g., a zone name, a zone identifier, etc.) in the relational database.

In some embodiments, step 706 includes identifying a building zone associated with an emitter identifier received from the mobile device. Relationships between emitter identifiers and building zones may be stored in memory (e.g., in a database, in a table, etc.). Step 706 may include using an emitter identifier received from a mobile device as an input to determine a corresponding building zone. The building zone associated with an emitter identifier may be a building zone in which the associated wireless emitter is located or a building zone located proximate to the associated wireless emitter.

Still referring to FIG. 7, process 700 is shown to include using at least one of the user identifier and the device identifier to identify a user associated with the mobile device (step 708). In some embodiments, step 708 is performed by user detection module 154, as described with reference to FIG. 4. The user associated with a mobile device may be, for example, a user of the mobile device from which the emitter identifier is received. In some embodiments, mobile devices report a device identifier (e.g., a MAC address, an IP address, a device name, etc.) and/or user identifier (e.g., a user name, a login ID, a user group, etc.) in conjunction with the emitter identifier. Step 708 may include using the device identifier and/or user identifier to identify a particular device, user, or user account associated with the mobile device.

Still referring to FIG. 7, process 700 is shown to include controlling a variable state or condition of the building zone in which the mobile device is located based on an identity of the user associated with the mobile device (step 710). In some embodiments, step 710 is performed by building control services module 164, as described with reference to FIG. 4. For example, step 710 may include using the identity information for the user associated with the mobile device to identify the user's preferred environment conditions (e.g., temperature conditions, air flow conditions, etc.) for a building zone. Step 710 may include automatically adjusting control setpoints (e.g., temperature setpoints, flow rate setpoints, etc.) for the building zone to the user's preferred values when the user (or mobile device associated with the user) enters a building zone. In some embodiments, if two or more users with conflicting preferences are located within the same building zone, step 710 may include using the user identities to select one set of preferred control parameters over another (e.g., based on user authority levels, based on which user is higher ranking in an organization, etc.).

In some embodiments, step 710 includes using emitter identifiers received from a plurality of mobile devices to estimate a number of occupants in a building zone. Step 710 may include controlling a variable state or condition of each of the building zone based on the estimated number of occupants in the building zone. For example, a large number of occupants in a building zone may cause air flow to the building zone to be increased in step 710 to recycle air more quickly. In some embodiments, step 710 includes reporting the estimated number of occupants in the building zone to at least one of security personnel and emergency personnel via a user interface device.

In some embodiments, step 710 includes providing a local control interface to the mobile device based on the identity of the user and/or the location of the mobile device. Different users may have different permissions and/or authorities for monitoring or controlling conditions within the building. For example, a system administrator or service technician may have be authorized to adjust setpoint parameters whereas other users may not have such authority. The identity of the user associated with a mobile device may be used to select a user interface with appropriate control options (e.g., control options matching the user's permission level) to provide to the mobile device.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), OLED (organic light emitting diode),TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific embodiment details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product embodied on a tangible medium or packaged into multiple such software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the description or claims and is not admitted to be prior art by inclusion in the background section.

What is claimed is:

1. A method for providing a location-based user interface to a mobile device in a building management system, the method comprising:
   providing a plurality of wireless emitters in a building, wherein each of the wireless emitters is located at a different position in the building and is associated with a different emitter identifier;
   receiving, at a processing circuit of the building management system, a request for a user interface for presentation on a mobile device, the request comprising an emitter identifier associated with one of the plurality of wireless emitters detected by the mobile device;
   determining, at the processing circuit, a distance of the mobile device from building equipment based at least in part on the emitter identifier;
   determining, at the processing circuit, whether the distance of the mobile device from the building equipment is greater than a minimum safety distance;
   determining, at the processing circuit, whether the distance of the mobile device from the building equipment is less than a maximum safety distance;
   selecting, by the processing circuit, a user interface for a building zone associated with the emitter identifier, wherein the selecting comprises selecting the user interface from multiple different user interfaces for the building zone based on the distance of the mobile device form the building equipment by:
   selecting a first user interface in response to determining that the distance of the mobile device from the building equipment is greater than the minimum safety distance and less than the maximum safety distance, the first user interface comprising information relating to an environmental condition of the building zone and a control option for controlling the building equipment; or
   selecting a second user interface in response to determining that the distance of the mobile device from the building equipment is less than the minimum safety distance or greater than the maximum safety distance, wherein the second user interface comprises the information relating to the environmental condition of the building zone without the control option for controlling the building equipment; and
   providing the selected user interface to the mobile device.

2. The method of claim 1, wherein selecting the user interface for the building zone associated with the emitter identifier comprises:
   using the emitter identifier to determine a building zone in which the mobile device is located; and
   selecting the user interface associated with the building zone in which the mobile device is located.

3. The method of claim 1, wherein the mobile device actively detects a wireless signal from one or more of the plurality of wireless emitters, the wireless signal comprising the emitter identifier;
   wherein the request for the user interface is made by an application executing on the mobile device.

4. The method of claim 1, wherein the selected user interface comprises other control options for controlling a variable state or condition of the building zone associated with the emitter identifier.

5. The method of claim 1, wherein selecting the user interface for the building zone comprises selecting the user interface from a plurality of user interfaces each associated with different building zones.

6. The method of claim 1, wherein the request for a user interface further comprises a user identifier, wherein the user identifier is associated with a permission level.

7. The method of claim 1, further comprising:
   identifying whether the building equipment is in the building zone associated with the emitter identifier;
   wherein the user interface comprises an equipment maintenance history for the building equipment in the building zone associated with the emitter identifier.

8. The method of claim 1, wherein selecting further comprises:
   using the emitter identifier to determine whether the mobile device is located in a same building zone in which a particular piece of machinery is located; and
   selecting a user interface which allows control over the piece of machinery based on a result of the determination.

* * * * *